United States Patent [19]

Miki

[11] Patent Number: 4,668,497

[45] Date of Patent: May 26, 1987

[54] PROCESS FOR PURIFYING HYDROGEN FLUORIDE

[75] Inventor: Nobuhiro Miki, Osaka, Japan

[73] Assignee: Hashimoto Chemical Industries Co., Ltd., Osaka, Japan

[21] Appl. No.: 813,219

[22] Filed: Dec. 24, 1985

[30] Foreign Application Priority Data

Dec. 25, 1984 [JP] Japan .................................. 59-280090
Sep. 2, 1985 [JP] Japan .................................. 60-194140

[51] Int. Cl.$^4$ ............................................... C01B 7/19
[52] U.S. Cl. ........................................ 423/484; 203/29; 210/753; 423/488
[58] Field of Search ............... 423/210 R, 219 M, 483, 423/488, 484, 240 R; 210/753, 915; 203/29

[56] References Cited

U.S. PATENT DOCUMENTS

| 3,166,379 | 1/1965 | Bradley et al. ...................... 423/484 |
| 4,083,941 | 4/1978 | Jayawant et al. ................... 423/488 |
| 4,491,570 | 1/1985 | Wheaton et al. ................... 423/483 |

FOREIGN PATENT DOCUMENTS

| 47-16407 | 5/1972 | Japan . |
| 1141260 | 1/1969 | United Kingdom ................ 423/484 |

*Primary Examiner*—John Doll
*Assistant Examiner*—Jeffrey Edwin Russel
*Attorney, Agent, or Firm*—Armstrong, Nikaido, Marmelstein & Kubovcik

[57] ABSTRACT

A process for purifying hydrogen fluroide characterized by adding fluorine to hydrogen fluoride containing at least one element selected from the group consisting of boron, silicon, phosphorus, sulfur, chlorine and arsenic, and/or at least one compound of these elements, reacting the fluorine with said element and/or said compound and distilling the resulting mixture.

6 Claims, No Drawings

PROCESS FOR PURIFYING HYDROGEN FLUORIDE

The present invention relates to a process for purifying hydrogen fluoride, and more particularly to a process for preparing purified hydrogen fluoride by removing impurities from hydrogen fluoride.

It is well known that purified hydrofluoric acid and fluorine compounds prepared therefrom are in great demand as important chemicals in the electronics industry. These chemicals are generally used as indispensable materials especially in various treating processes for semiconductor products ranging from wafers to devices. With increasing complexity of integration of semiconductors, there is a growing demand for these chemicals of higher purity.

The presence of boron, silicon, phosphorus, sulfur, chlorine, arsenic and compounds of these elements is objectionable to semiconductors, and purification of hydrofluoric acid by removing such impurities contributes a great deal to the advance of semiconductors. While various fluorine compounds are used in new technical fields as optical industrial materials, solar cell materials and new ceramics materials, hydrofluoric acid of high purity is in strong demand also as the starting material for these fluorine compounds.

With the recent progress of techniques, semiconductors and other products in many fields must fulfill the requirement of ever improved performance, and hydrofluoric acid of higher purity is also required.

Boron, silicon, phosphorus, sulfur and chlorine present as impurities in hydrofluoric acid are in the form of various compounds which chiefly include $HBF_4$, $H_2SiF_6$, $HPF_6$, $HSO_3F$ and $HCl$. Any of these compounds can be removed to some extent by distilling the acid. Stated more specifically, when hydrofluoric acid is distilled, boron, silicon, phosphorus and chlorine compounds are concentrated in the form of low-boiling distillates such as $BF_3$, $SiF_4$, $PF_5$ and $HCl$, respectively, and distilled off as the initial fraction. Of the sulfur compounds, those in the form of $SO_2$ are distilled off as contained in a low-boiling fraction, and those in the form of $SO_3$ are distilled off as contained in a relatively high-boiling fraction separately from the former. However, this method is limited in its removal efficiency, and the reduction of impurity contents achievable is at most to a level of the order of several tens of ppm. Thus, the purity of hydrofluoric acid obtained is much lower than the level recently required.

It is already known that the presence of arsenic and compounds thereof greatly influences the performance of semiconductors. Methods of removing arsenic and compounds thereof have been proposed. The proposed methods include those wherein an oxidizer, such as potassium permanganate or the like, is used. With the method disclosed in Examined Japanese Patent Publication SHO 47-16407, for example, the manganese or chromium content of such an oxidizer distills off to contaminate the purified hydrofluoric acid, so that the desired object can not be achieved unless the oxidizer is used conjointly with a ferric salt. However, the use of ferric salt entails the drawback of contaminating the acid with a high iron content.

U.S. Pat. No. 3,166,379 discloses a method wherein an oxidizer is used in combination with a compound of halogen such as iodine, chlorine or bromine. This method has the greatest drawback that the iodine, chlorine or bromine used in an excessive amount distills off as contained in the product, seriously contaminating the product with a different impurity element.

Another method developed employs hydrogen peroxide for removing arsenic compounds. For example, U.S. Pat. No. 4,083,941 discloses such a method, but the purifying treatment takes at least 70 hours and is very inefficient and unsuited to an industrial operation.

An object of the present invention is to provide a process for purifying hydrogen fluoride by effectively removing at least one impurity element selected from the group consisting of boron, silicon, phosphorus, sulfur, chlorine and arsenic, and/or a compound thereof.

Another object of the present invention is to provide a process for removing from hydrogen fluoride the above-mentioned elements and/or compounds thereof in amounts of the order of ppb to achieve a high purity.

Another object of the present invention is to provide a process for purifying hydrogen fluoride by removing arsenic and/or a compound thereof without entailing new contamination due to the use of an oxidizer.

Anoter object of the present invention is to provide a novel process for purifying hydrogen fluoride by removing arsenic and/or a compound thereof without entailing new contamination with iron.

Still another object of the present invention is to provide a process for purifying hydrogen fluoride containing arsenic and/or arsenic compounds without resulting in new contamination due to iodide, chlorine, bromine or like halogen compounds.

These objects and other features of the present invention will become apparent from the following description of the invention.

The foregoing objects can be fulfilled by adding fluorine to hydrogen fluoride containing at least one element selected from the group consisting of boron, silicon, phosphorus, sulfur, chlorine and arsenic, and/or at least one compound of these elements, reacting the mixture and distilling the reaction mixture.

Thus, the present invention provides a process for purifying hydrogen fluoride characterized by adding fluorine to hydrogen fluoride containing at least one element selected from the group consisting of boron, silicon, phosphorus, sulfur, chlorine and arsenic and/or at least one of compounds of these elements, reacting the mixture and distilling the resulting reaction mixture.

The term "hydrogen fluoride" as herein used refers to hydrogen fluoride containing less than 3% by weight of water.

The process of the present invention purifies hydrogen fluoride containing at least one of boron, silicon, phosphorus, sulfur, chlorine or arsenic, and/or at least one of compounds of these elements. These elements and/or compounds thereof contained are not limited specifically.

The impurity content of hydrogen fluoride due to the presence of such elements therein is usually up to 500 ppm, preferably up to 100 ppm. Hydrogen fluoride having a high impurity content is first purified to some extent by a suitable known method, for example, by distillation, and is then purified by the present process.

Although the forms in which the above elements and/or compounds thereof are present in hydrogen fluoride are not always known in detail, typical examples of compounds which are thought to be present are as follows.

(1) Boron compounds
$BF_3$, $B_2F_4$, $HBF_4$, $HBF_3(OH)$, $HBF_2(OH)_2$.

(2) Phosphorus compounds
  $PF_3$, $PF_5$, $HPF_6$, $(HO)_2POF$, $(HO)POF_2$, $POF_3$.
(3) Sulfur compounds
  $SF_4$, $SF_6$, $S_2F_{10}$, $SOF_2$, $SO_2F_2$, $HSO_3F$.
(4) Silicon compounds
  $SiF_4$, $Si_2F_6$, $H_2SiF_6$, $(SiF_3)_2O$.
(5) Chlorine compounds
  $HCl$, $H_2FCl$, $H_3ClO$.
(6) Compounds of above elements
  $BCl_3$, $PCl_5$, $SF_5Cl$.
(7) Arsenic compounds
  $AsF_3$, $AsF_5$, $HAsF_6$.

It is thought that these compounds, when present in hydrogen fluoride, will undergo various complex reactions with some water which is also present conjointly therewith. Examples of such reactions actually occuring will presumably be as follows.

$$HSO_3F + H_2O \rightleftharpoons H_2SO_4 + HF \quad (a)$$

$$HBF_4 + H_2O \rightleftharpoons HBF_3(OH) + HF \quad (b)$$

$$HBF_3(OH) + H_2O \rightleftharpoons HBF_2(OH)_2 + HF \quad (c)$$

$$(HO)_2POF + H_2O \rightleftharpoons H_3PO_4 + HF \quad (d)$$

$$(HO)POF_2 + H_2O + (HO)_2POF + HF \quad (e)$$

$$POF_3 + H_2O \rightleftharpoons (HO)POF_2 + HF \quad (f)$$

$$PF_5 + H_2O \rightleftharpoons POF_3 + 2HF \quad (g)$$

$$2H_2SiF_6 + 2H_2O \rightleftharpoons SiF_4 + SiO_2 + 8HF \quad (h)$$

$$HCl + H_2O \rightleftharpoons H_3ClO \quad (i)$$

Such compounds, in whatever forms, can be effectively removed by addition of fluorine and subsequent reaction according to the present invention.

In practicing the process of the invention, fluorine is added to hydrogen fluoride containing these impurities and reacted with the impurities, followed by distillation. For this process, fluorine is used singly as fluorine gas, or as admixed with other inert gas, or as dissolved in an inert liquid. The inert gas and liquid are those which will not participate in the reaction. Examples of useful gases are helium, nitrogen, hydrogen fluoride and the like. Example of useful liquid is liquid hydrogen fluoride.

The amount of fluorine to be used is determined suitably according to the concentration of impurities contained in hydrogen fluoride. When the overall impurity content is abont 50 to about 100 ppm, fluorine is used usually in an amount of about 50 to about 70 ppm.

The reaction between fluorine and the impurities is conducted at a temperature of $-40°$ to $400°$ C., preferably about $-20°$ to about $20°$ C., at a reduced pressure, atmospheric pressure or elevated pressure. The reduced pressure to be used is usually 0.8 kg/cm², while the pressure to be applied to about 2 kg/cm².

According to the present invention, the reaction of fluorine with the impurities must be followed by distillation. The distillation may be conducted after fluorine has been reacted, or fluorine may be added during distillation. The distillation may be conducted batchwise or continuously, whereby a satisfactory result can be achieved.

According to the present invention, the impurities can be effectively removed from hydrogen fluoride by the very simple procedure of adding fluorine to hydrogen fluoride, reacting the fluorine with the impurities and distilling the resulting reaction mixture. The impurities can be removed to a concentration much lower than heretofore possible. More specifically stated, boron, phosphorus, silicon, sulfur and chlorine impurities can be removed to the order of several ppb which has heretofore been thought impossible, while the arsenic content can be reduced to the order of $10^{-4}$ ppm, whereas such a great reduction is conventionally considered impossible. Surprisingly, such effect can be achieved only when fluorine is used among other halogen elements. In fact, other halogen, such as chlorine, bromine or iodine, is totally unable to attain the above remarkable result. To substantiate this, an experiment was conducted in which hydrogen fluoride containing arsenic impurities was purified with use of various halogen elements. Each halogen element listed in Table 1 was added in an amount of 70 ppm to hydrogen fluoride containing 10 ppm of arsenic at room temperature and atmospheric pressure. After allowing the mixture to stand under the same conditions for one hour, the mixture was distilled. The hydrogen fluoride purified was hydrolyzed and thereafter checked for the concentrations of arsenic and remaining halogen element by hydride generation flameless atomic absorption spectrometry and iodometry. Table I shows the results.

TABLE 1

| Halogen element | | As concn. before/after purification | | Halogen concn. of purified hydrogen fluoride (ppm) |
|---|---|---|---|---|
| Kind | Concn. (ppm) | Before (ppm) | After (ppm) | |
| F | 70 | 10 | Up to 0.005 | Up to 0.1 |
| Cl | 70 | 10 | 3 | 55 |
| Br | 70 | 10 | 1 | 11 |
| I | 70 | 10 | 6 | 3 |

Table 1 reveals that fluorine only among other halogen elements exhibits an outstanding effect to remove arsenic.

While Table 1 shows the experimental results achieved for hydrogen fluoride containing an arsenic compound, similar results are obtained in removing other impurities.

According to the present invention, impurities can be removed effectively from hydrogen fluoride by adding fluorine thereto. Depending upon the use of hydrogen fluoride and also of hydrofluoric acid, it may be desirable to remove the fluorine added. In this case, it is desired to remove the remaining fluorine by hydrolysis with addition of water after the reaction of fluorine and distillation. The hydrolysis proceeds rapidly upon addition of water at room temperature at atmospheric pressure. According to the invention, however, the system may be heated usually at a temperature of up to about 50° C. Water may be added to the resulting reaction mixture again, followed by distillation. The hydrolysis almost completely removes the fluorine remaining in the hydrogen fluoride (which is actually in the form of hydrofluoric acid owing to the addition of water).

The amount of water to be added is not limited specifically but may be such as is sufficient to remove the remaining fluorine by hydrolysis.

Air is usable for the hydrolysis. Because fluorine can be hydrolyzed by several hundreds of ppm of water contained in air, the hydrolysis can be effected by blowing air into the purified hydrogen fluoride, i.e., by so-called aeration. For this purpose, air is used in an amount of 5 to 15 m³/1 Ton of HF, preferably about 8 to about 12 m³/HF, 1 Ton, at a flow rate of 0.05 to 1.0 m/sec, preferably about 0.1 to 0.5 m/sec.

By the process of the present invention, hydrogen fluoride containing at least one of boron, silicon, phosphorus, sulfur, chlorine and arsenic and/or at least one compound of these elements can be purified to a very high level. More specifically, boron, silicon, phosphorus, sulfur and chlorine impurities, which are removed to the order of ppm by conventional methods, can be removed to the order of ppb, and arsenic impurities are removable to an impurity content of the order of $10^{-4}$ ppm.

Moreover, arsenic impurities can be removed very effectively without entailing any secondary contamination due to the use of the treating chemical unlike the conventional processes.

The present process has another advantage that the amount of fluorine used can be much smaller than the amount of chemical heretofore used. For example, 1000 to 10,000 ppm of potassium permanganate or about 9000 ppm of hydrogen peroxide is needed per 100 ppm of the impurity content, whereas up to 100 ppm, usually 10 to 100 ppm, of fluorine produces a sufficient effect.

Furthermore, the present process entails no secondary contamination because the fluorine used can be completely removed by the extremely simple method of hydrolysis.

The hydrogen fluoride purified by the process of the present invention contains less than 3% of water and may be used as it is. Usually, however, water is added thereto to obtain hydrogen fluoride of desired concentration for use. When the purified hydrogen fluoride is used after removing the remaining fluorine, the resulting hydrogen fluoride is substantially in the form of hydrofluoric acid due to the presence of water added for the removal of fluorine, so that it is used as it is, or water is further added for use as hydrofluoric acid.

The process of the invention will be described in greater detail with reference to the following examples.

EXAMPLE 1

A 800 g quantity of hydrogen fluoride (99.8% of HF, about 50 ppm of water and 10 ppm of As impurities) was placed into a one-liter polytrifluorochloroethylene container equipped with a reflux condenser and a distillation tube. Fluorine gas (99.1% of $F_2$ and 0.3% of HF) was introduced into and dissolved in hydrogen fluoride to a concentration of 75 ppm, the container was then heated to 20° C., and hydrogen fluoride was thereafter distilled. The resulting fraction was collected to obtain purified hydrogen fluoride, which was found to contain up to 0.0001 ppm of arsenic and was useful as an electronics material.

EXAMPLE 2

A 750 g quantity of hydrogen fluoride (97.1% HF, 2.8% $H_2O$ and 8 ppm of As impurities) was placed into the same container as used in Example 1. Fluorine gas (88.2% $F_2$ and 11.8% HF) in an amount of 0.3 g calculated as $F_2$ was introduced into and dissolved in hydrogen fluoride, the container was heated, and hydrogen fluoride was distilled to obtain purified hydrogen fluoride. The purified hydrogen fluoride was found to contain up to 0.0001 ppm of arsenic and was useful as an electronics material.

EXAMPLE 3

A rectification device was used which was equipped with a charge column made of polytetrafluoroethylene and having a polytetrafluoroethylene condenser. A fluorine electrolysis container (20 liters) was connected to a continuous feeder for charging the hydrogen fluoride to be purified into the device. Hydrogen fluoride (99.9% HF and 9 ppm As) was continuously charged into the device at a rate of 80 kg/hour while fluorine gas (87.5% $F_2$ and 12.5% HF) was being continuously introduced into hydrogen fluoride from the electrolysis container via a gas inlet to an $F_2$ concentration of 100 ppm, and hydrogen fluoride was heated for rectification. The operation was continued for 10 hours to obtain purified hydrogen fluoride, which was found to contain up to 0.0001 ppm of arsenic.

The hydrogen fluoride was diluted with water of superhigh purity using a dilution device made of polytetrafluoroethylene and provided separately to obtain 50% hydrofluoric acid, which was found to contain up to 0.1 ppm of remaining fluorine.

EXAMPLE 4

The same device as used in Example 3 was used, to which hydrogen fluoride (99.9% HF and 9 ppm of As) was supplied at a rate of 80 kg/hour. Fluorine gas (88.0% $F_2$ and 12% HF) was continuously introduced into hydrogen fluoride from the electrolysis container via the inlet to an $F_2$ concentration of 100 ppm for rectification. The purified hydrogen fluoride was found to contain up to 0.0001 ppm of arsenic. To the hydrogen fluoride, one m³ of clean air which contained about 1.5 wt% of water was passed at a rate of 0.3 m/sec. The acid was found to contain up to 0.1 ppm of remaining fluorine.

EXAMPLE 5

A 800 g quantity of hydrogen fluoride containing the impurities listed below was placed into 1-liter polychlorotrifluoroethylene container equipped with a reflux condenser and a distillation tube. Fluorine gas (98.6% $F_2$ and 1.4% HF) was intoduced into and dissolved in hydrogen fluoride at room temperature, the container was then heated for rectification, the first fraction was removed, and the subsequent fraction of hydrogen fluoride (b.p. 20° C.) was collected. The purified hydrogen fluoride was found to contain the impurities only in the amounts given below and was well-suited to use as an electronics material.

|  | B | Si | $PO_4$ | $SO_4$ | Cl |
| --- | --- | --- | --- | --- | --- |
| Hydrogen fluoride to be purified (ppb) | 50 | 3000 | 1000 | 5000 | 1000 |
| Purified hydrogen fluoride (ppb) | 2 | 15 | 8 | 16 | Up to 2 |

COMPARATIVE EXAMPLE 1

The same procedure as in above Example 5 was conducted without using Fluorine gas. The results obtained were shown below.

|  | B | Si | $PO_4$ | $SO_4$ | Cl |
| --- | --- | --- | --- | --- | --- |
| Hydrogen fluoride to be purified (ppb) | 50 | 3000 | 1000 | 5000 | 1000 |

-continued

|  | B | Si | PO$_4$ | SO$_4$ | Cl |
|---|---|---|---|---|---|
| Purified hydrogen fluoride (ppb) | 22 | 655 | 280 | 480 | 16 |

EXAMPLE 6

A 800 g quantity of hydrogen fluoride was placed into the same container as used in Example 5, fluorine gas (89.8% F$_2$ and 10.2% HF), in an amount of 0.4 g calculated as F$_2$, produced by a fluorine electrolysis container was introduced into and dissolved in hydrogen fluoride at −10° C., and the container was thereafter heated to distill the hydrogen fluoride and obtain purified hydrogen fluoride. Listed below are the amounts of impurities contained in hydrogen fluoride before and after the purification.

|  | B | Si | PO$_4$ | SO$_4$ | Cl |
|---|---|---|---|---|---|
| Hydrogen fluoride to be purified (ppb) | 50 | 3000 | 1000 | 5000 | 1000 |
| Purified hydrogen fluoride (ppb) | 3 | 13 | 7 | 15 | Up to 2 |

EXAMPLE 7

A rectification device was used which was adapted for continuous operation and equipped with a condenser and a charge column both made of polytetrafluoroethylene. A thin tube for supplying fluorine gas from a 20-liter fluorine electrolysis container was connected to a continuous feeder provided at the lower portion of the device for feeding the hydrogen fluoride to be purified into the device. While continuously charging hydrogen fluoride into the device at a rate of 80 kg/hour, fluorine gas (88.6% F$_2$ and 11.4% HF) was continuously introduced into hydrogen fluoride from the container via a gas inlet to an F$_2$ concentration of 100 ppm, and hydrogen fluoride was heated at about 20° C. for rectification. A light fraction was drawn off from a distillate tube at the top of the column, while hydrogen fluoride fractions were collected via second and third distillate tubes below the top. The operation was continued for 10 hours. Listed below are the amounts of impurities contained in hydrogen fluoride before and after the purification.

|  | B | Si | PO$_4$ | SO$_4$ | Cl |
|---|---|---|---|---|---|
| Hydrogen fluoride to be purified (ppb) | 50 | 4000 | 1000 | 3000 | 2000 |
| Purified hydrogen fluoride (ppb) | 2 | 16 | 8 | 15 | Up to 2 |

What is claimed is:
1. A process for purifying hydrogen fluoride comprising adding fluorine to hydrogen fluoride containing at least one element selected from the group consisting of boron, silicon, chlorine and arsenic, and/or at least one compound of these elements, reacting the fluorine with said element and/or said compound and distilling the resulting mixture.
2. A process as defined in claim 1 wherein the distillation is followed by hydrolysis to remove the remaining fluorine.
3. A process as defined in claim 2 wherein the hydrolysis is conducted while supplying air to the purified hydrogen fluoride.
4. A process as defined in claim 1 wherein the fluorine is diluted with an inert gas.
5. A process as defined in claim 1 wherein the fluorine is used as dissolved in an inert liquid.
6. A process as defined in claim 1 wherein water is added to the purified hudrogen fluoride to obtain hydrofluoric acid.

* * * * *